United States Patent

Seki et al.

[11] 4,396,827
[45] Aug. 2, 1983

[54] MULTI-ITEM DATA INPUT APPARATUS

[75] Inventors: Yashiro Seki; Mikio Miyo; Hideo Kobayashi, all of Tokyo, Japan

[73] Assignee: Anritsu Electric Company Limited, Tokyo, Japan

[21] Appl. No.: 361,173

[22] Filed: Mar. 24, 1982

[30] Foreign Application Priority Data

Mar. 27, 1981 [JP] Japan .................. 56-42416

[51] Int. Cl.³ .......................................... G06C 29/00
[52] U.S. Cl. ............................................. 235/61 PK
[58] Field of Search .................. 235/61 PA-61 PE, 235/58 P, 60 C, 60 P; 271/274

[56] References Cited

U.S. PATENT DOCUMENTS

| | | | |
|---|---|---|---|
| 3,106,340 | 10/1963 | Meister | 235/61 PD |
| 3,472,447 | 10/1969 | Rethmeier | 235/60 P |
| 3,739,978 | 6/1973 | Powell | 235/61 PK |
| 4,045,014 | 8/1977 | Karlsson | 271/274 X |
| 4,356,386 | 10/1982 | Hanagutu | 235/58 P |

Primary Examiner—Benjamin R. Fuller
Attorney, Agent, or Firm—Frank J. Jordan

[57] ABSTRACT

A multi-item data input apparatus is disclosed whereby an operator can designate one of a plurality of items by actuation of a key, thereby generating a signal indicative of that item. The items are visibly printed or written on a number of item information sheets, each of which is enclosed between a transparent cover sheet and a base sheet each of which is flexible, with the sheets being rolled around a cylindrical holder in a successively overlapping manner. Means are provided whereby a sheet set, comprising an item information sheet with cover sheet and base sheet, can be selectively unrolled and positioned below a keyboard having transparent keys, to allow designation of items on that item information sheet. The item information sheets can be rapidly and conveniently removed, for exchange of sheets or for modification of item information.

9 Claims, 19 Drawing Figures

MULTI-ITEM DATA INPUT APPARATUS

BACKGROUND OF THE INVENTION

The present invention relates to a device whereby a particular item may be specified, from a number of other items, by an operator manually generating an electrical signal to designate that particular item. The signal thus generated may for example be input to a computer or other data processing system, as a data input. One method of accomplishing this is to write or print data designating each of the items in predetermined positions, e.g. in a matrix array configuration, on each of a plurality of flexible sheets, and to roll these sheets in a successively overlapping manner around a cylindrical sheet holder. Means can then be provided, as will be made clear hereinafter by embodiments of the present invention, whereby a particular sheet can rapidly be selected and unrolled to be positioned below a keyboard having flexible keys arranged in positions corresponding to the items on the flexible sheet. Actuation of a key corresponding to a desired item can then generate a signal designating that item. Such an apparatus has a number of advantages, including ease and rapidity of selecting a desired item, and simplicity of use, with no special operator skills being required. However, if it is desired to change the information provided on a sheet, either partially or completely, then it is necessary either to completely remove the sheet in question, or to erase items from that sheet and write in new items. This can be troublesome and time-consuming. In addition, since there will generally be some degree of contact between a sheet, when it is selected and unrolled, and other parts of the apparatus, the resultant friction will eventually result in partial or complete erasure of the information recorded on a sheet.

There is therefore a requirement for an apparatus of the general form described above, which would not present the disadvantages related in the preceding paragraph, yet which would retain the considerable advantages offered by such a multi-item data input apparatus of the form described above. This requirement is achieved by a multi-item data input apparatus according to the present invention, as will be described in the following, with respect to specific embodiments.

SUMMARY OF THE INVENTION

The present invention comprises a multi-item data input apparatus, whereby a plurality of items which appear in predetermined positions upon a flexible sheet, referred to hereinafter as an item information sheet, can be rapidly and conveniently selected by keyswitch actuation to be positioned below a keyboard having a plurality of transparent key switches, whereby a desired one of the items on the selected item information sheet can be rapidly and easily designated by actuation of a corresponding key switch. It is an important feature of a multi-item data input apparatus according to the present invention that each of the item information sheets is held between a flexible base sheet and a flexible transparent cover sheet, to form an assemblage which will be referred to hereinafter as a sheet set. A plurality of such sheet sets, each comprising a base sheet, an item information sheet and a cover sheet, as described above, are fixedly attached to a cylindrical sheet holder, and normally are rolled around the sheet holder in a successively overlapping manner. Means are provided whereby, through appropriate rotation of the sheet holder, a selected one of the sheet sets can be unrolled from the sheet holder and positioned below a keyboard, as described above.

As a result of retaining each item information sheet between a base sheet and a cover sheet, such that the item information sheet is rapidly and easily removable therefrom, the various item information sheets can be quickly and conveniently exchanged, or the contents of an item information sheet can be erased or rewritten.

In addition, the provision of a base sheet and a cover sheet in a sheet set serves to protect the item information sheet of that sheet set from gradual erasure of the contents of the item information sheet, as a result of frictional contact between the item information sheet and other parts of the multi-item data input apparatus when the sheets are repetitively rolled and unrolled over a period of time. Thus, the items appearing on each item information sheet are kept in a clearly legible condition over a long period of usage, thereby considerably contributing to the practicability of such a multi-item data input apparatus.

Furthermore, the present invention also discloses simple and effective means whereby the item information sheet can be held in an accurately predetermined position with respect to the base sheet and the cover sheet of the corresponding sheet set, while at the same time the item information sheet is rapidly and conveniently removable from between the base sheet and cover sheet.

Simple and effective means are also disclosed for eliminating a buildup of static electrical charge upon the sheet sets and portions of the multi-item data input apparatus which are contacted by the sheet sets during rolling and unrolling operations. The elimination of such static electric charge buildup serves to eliminate adhesion of the sheet sets to other parts of the apparatus during the unrolling operation of a sheet set, and this also can significantly increase the practicability of such a multi-item data input apparatus.

Embodiments of the present invention will now be described, with reference to the attached drawings.

DESCRIPTION OF THE PREFERRED EMBODIMENTS

Figure 1:
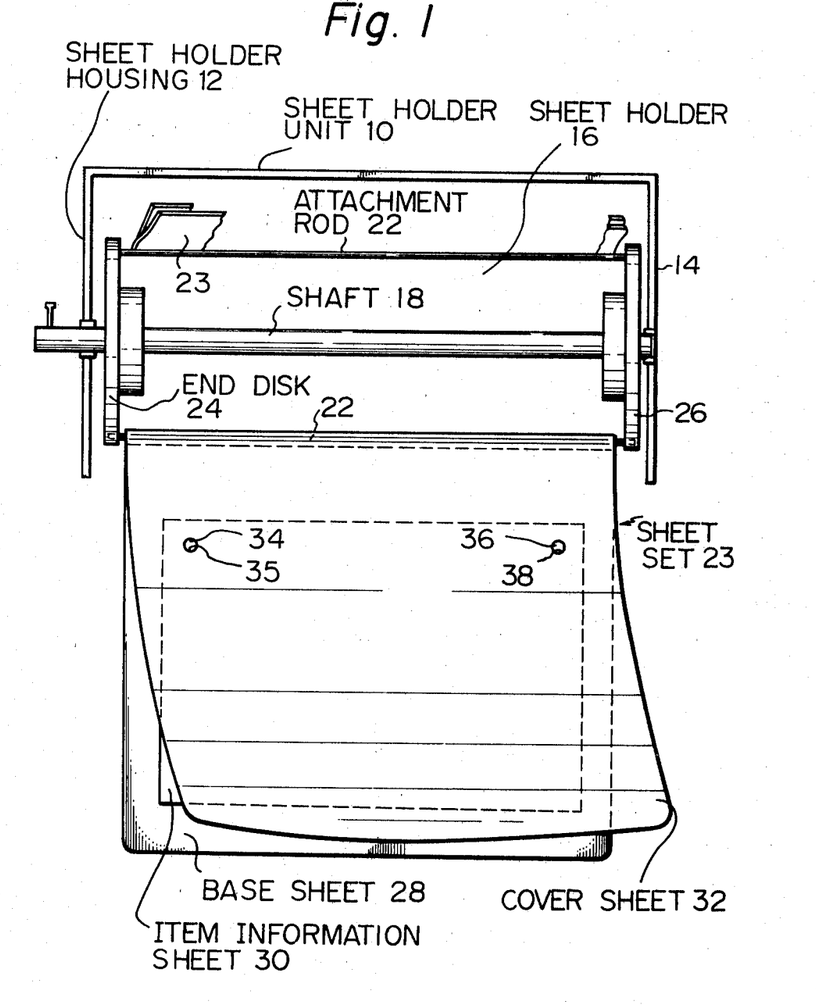
FIG. 1 is a simplified diagram illustrating the relationship between a sheet set, a sheet holder, and a sheet holder housing in which the sheet holder is rotatably mounted.

Referring first to FIG. 1, a simplified diagram is shown therein to illustrate how a sheet holder, sheet sets attached thereto, and a sheet holder housing, are assembled, for use in an embodiment of a multi-item data input apparatus according to the present invention. In FIG. 1, numeral 10 denotes a sheet holder unit, in which a sheet holder 16 is rotatably mounted in end walls 12 and 14 of a sheet holder housing 12. The sheet holder housing 12, sheet holder 16, and sheet sets attached thereto constitute an independent sub-assembly of the multi-item data input apparatus, which can be removed from and inserted into the main body of the apparatus, described hereinafter. The sheet holder 16 comprises a shaft 18, having a coupling member provided thereon to engage with drive means used to rotate the sheet holder (not shown in the drawings, for brevity of description), end disks 24 and 26, and a plurality of attachment rods collectively designated by reference numeral 22, which are arranged at regular intervals around the inner peripheries of end disks 24 and 26.

A sheet set 23 is attached at one end thereof to each of attachment rods 22. Each sheet set 23 comprises a base sheet 28, an item information sheet 30, and a transparent cover sheet 32, with each of sheets 28, 30 and 32 being flexible, i.e. sheet set 23 is flexible. The base sheet 28 and cover sheet 32 are fixedly attached at one end of each sheet to an attachment rod 22, as shown, while item information sheet 30 is held between base sheet 28 and cover sheet 32 in a freely removable manner, i.e. item information sheet can be removed simply by lifting up cover sheet 32.

Positioning means are provided in this embodiment, to retain item information sheet 30 in a desired position with respect to base sheet 28 and cover sheet 32, with the positioning means comprising, in this case, two catch members comprising upwardly protruding portions of base sheet 28, denoted by numerals 35 and 38, which engage in apertures 34 and 36 formed in item information sheet 30. Such positioning means will be described in greater detail hereinafter.

Figure 2:
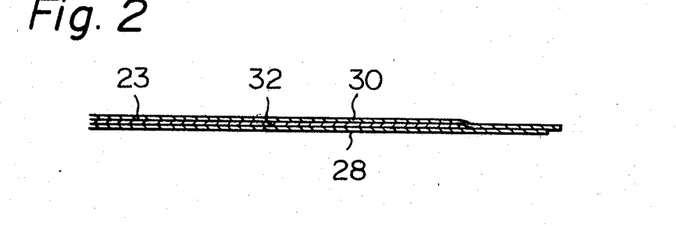
FIG. 2 is a cross-sectional diagram for illustrating the configuration of a sheet set with an item information sheet held sandwiched between a base sheet and a cover sheet.

A plurality of items are visibly printed or written on item information sheet 30, on the upper surface thereof (i.e. the surface which is adjacent to cover sheet 32), with these items being arranged in a predetermined set of positions, for example in a matrix array configuration. The relationship between the base sheet 28, item information sheet 30 and cover sheet 32 when item information sheet is being held sandwiched between the base and cover sheets 28 and 32, is shown in the cross-sectional diagram of FIG. 2.

Figure 3:
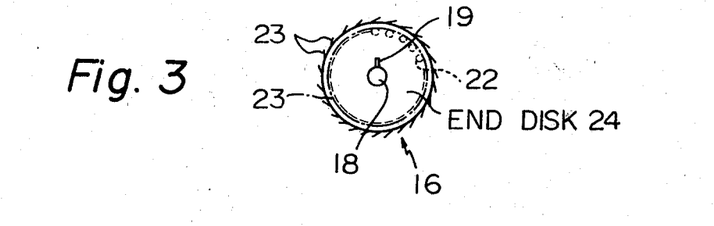
FIG. 3 is a diagram for illustrating a manner in which a plurality of sheet sets are rolled in a successively overlapping manner around a sheet holder.

FIG. 3 is a view of sheet holder 16, as viewed endwise looking toward end disk 24, for illustrating the manner in which sheet sets 23 are rolled around sheet holder 16 such as to overlap one another successively, at regular angular intervals.

Figure 4:
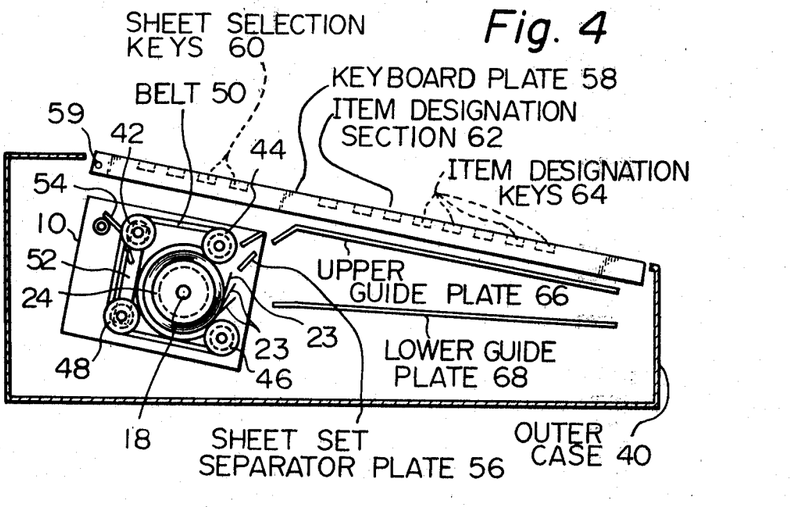
FIG. 4 is a cross-sectional diagram for illustrating the general configuration of an embodiment of a multi-item data input apparatus according to the present invention, for a condition in which a plurality of flexible sheet sets are held rolled on a sheet holder, prior to selection of one of the sheet sets.

FIG. 4 is a cross-sectional view of an embodiment of a multi-item data input apparatus according to the present invention, in which the components of sheet holder unit 10 are shown in greater detail than in the simplified diagram of FIG. 1. Numerals 42, 44 and 46 denote three rollers which are rotatably mounted in an end wall of sheet holder unit 10, while a fourth roller 48 is rotatably mounted on a lever 52. Lever 52 is mounted such as to be freely rotatable about the axis of roller 42, and is urged in a clockwise direction by a spring 54. An endless belt 50 is mounted over rollers 42, 44, 46 and 48 in such a way that a portion of belt 50 which passes between rollers 44 and 46 also passes around a major part of the periphery of sheet holder 16 with flexible sheet sets 23 rolled around the periphery thereof. Thus, belt 50 serves to retain flexible sheet sets 23 in the rolled condition, and is maintained in a taut condition as a result of the tension exerted by spring 54.

Figure 5:
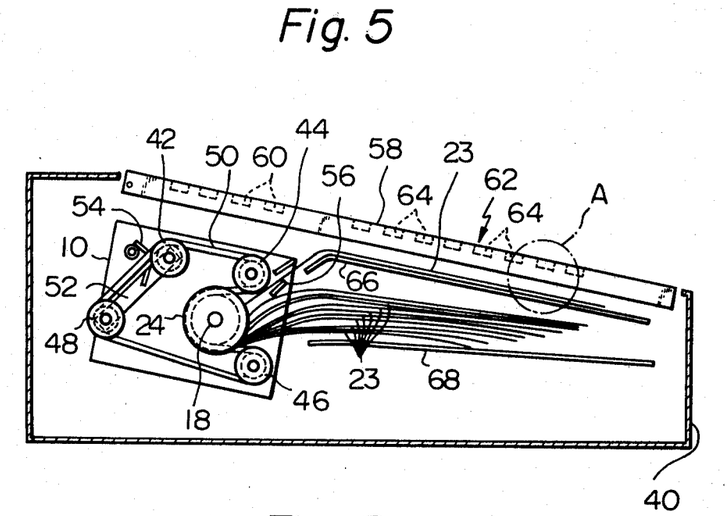
FIG. 5 is a cross-sectional diagram of the apparatus of FIG. 4, illustrating the condition in which a sheet sethas been selected and unrolled to enable designation of items appearing thereon.

Numeral 56 denotes a sheet holder unit guide plate, which serves to guide a selected one of the flexible sheet sets out of the sheet holder unit 10 when required, as described hereinafter. When sheet holder unit 10 is mounted in the multi-item data input apparatus, the coupling member 19 of shaft 18 of sheet holder 16, becomes coupled to drive means (not shown in the drawings), whereby sheet holder 16 can be rotated in a clockwise or counterclockwise direction into various predetermined angular positions. If sheet holder 16 is rotated first in the clockwise direction, then as a result of the action of belt 50, all of flexible sheet sets 23 will be retained in the rolled condition on sheet holder 16. If this rotation is now halted at some particular angular position, and sheet holder 16 is now rotated through a small angle in the counterclockwise direction, then some of flexible sheet sets 16 will begin to unroll from sheet holder 16, and as can be seen in FIG. 4, sheet holder guide plate 56 is positioned such as to select one specific sheet set to be directed outward from sheet holder unit 10, e.g. the uppermost sheet set 23 shown in FIG. 4. Numeral 66 denotes an upper guide plate and numeral 68 a lower guide plate, which are fixedly attached adjacent to sheet holder unit 10. When a particular sheet set is selected and transferred outward from sheet holder unit 10 as a result of rotation operations described above, then the selected sheet set is directed by sheet holder unit guide plate 56 onto the upper surface of upper guide plate 66. Other sheet sets 23 which are unrolled at the same time as the selected sheet set become directed onto the upper surface of lower guide plate 68. When the selected sheet set has been completely unrolled and positioned on upper guide plate 66, rotation of sheet holder 16 is halted. The resultant condition is now as shown in FIG. 5. As can be seen, the action of spring 54 upon lever 52 serves to hold belt 50 in a taut condition.

Numeral 58 denotes a keyboard plate which is disposed immediately above upper guide plate 66. This keyboard plate 58 is attached at one end to a hinge member 59 to outer case 40 of the multi-item data input apparatus, so that keyboard plate 58 can be lifted upward away from upper guide plate 66 when required, to thereby enable the operator to have access to a sheet set 23 positioned on upper guide plate 66. A plurality of sheet selection key switches 60 are provided on the upper part of keyboard plate 58. To select a particular sheet set on sheet holder 16, the operator actuates a corresponding one of sheet selection key switches 60. Electrical signals are generated thereby, which act to control the operation of the drive means whereby sheet holder 16 is rotated successively in the clockwise and counterclockwise directions as described above, to direct the required sheet set onto upper guide plate 66, as described above. Numeral 64 collectively designates a set of item designation key switches. Each of key switches 64 is transparent and is positioned such as to be immediately above a corresponding item on each of item information sheets 30 of sheet sets 23 on sheet holder 16. Thus, when a selected sheet set has been unrolled and positioned on upper guide plate 66, the items appearing on the item information sheet of that sheet set are visible through item designation key switches 64. To designate a desired item, the operator actuates the appropriate one of item designation key switches 64. The signal which is thus produced by that item designation key switch can be input to equipment such as a computer or other data processing apparatus.

After such an item designation operation has been performed, using item designation key switches 64, items appearing on another item information sheet can then be positioned below keyboard plate 58 by actuating the appropriate one of sheet selection keys 60. The sheet holder 16 will then be rotated in the clockwise direction, thereby rolling the sheet set currently positioned on upper guide plate 66 back onto sheet holder 16, and the sheet set selection operations described hereinabove will then be repeated, to unroll a new sheet set onto upper guide plate 66.

As stated above, keyboard plate 58 can be swung upward to enable immediate access to a selected sheet set positioned on upper guide plate 66. By lifting the cover sheet 32 of that sheet set, the item information sheet can be removed and exchanged, or items appearing on that item information sheet can be immediately amended or erased. Since the item information sheet 30 is held between the base sheet 28 and cover sheet 32 in a freely removable manner, as described hereinabove, item information sheets can be quickly and conveniently exchanged.

Figure 6:
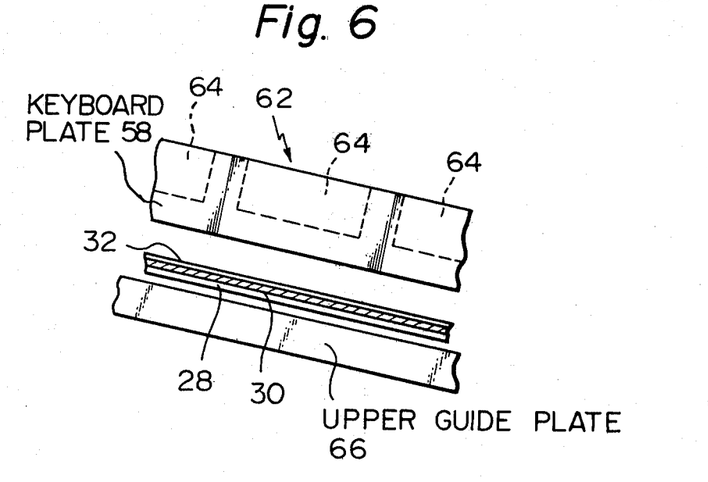
FIG. 6 is a partial cross-sectional diagram for illustrating the relationship between a keyboard, item designating keys, and sheet set, in the embodiment of FIG. 4 and FIG. 5.

FIG. 6 is a partial cross-sectional diagram for illustrating a portion of the multi-item data input apparatus shown in FIG. 5, i.e. the portion of the apparatus of FIG. 5 indicated by the circle portion designated by the letter A. As shown, base sheet 28 les on or adjacent to the upper surface of upper guide plate 66, while transparent cover sheet 32 faces the keyboard plate 58.

Figure 7A:
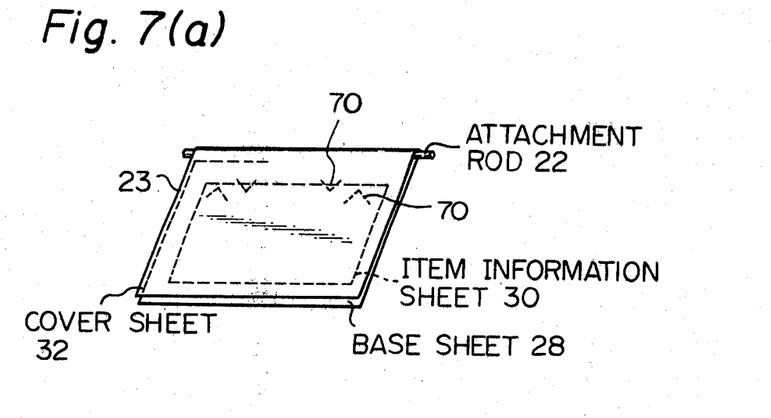
FIG. 7(a) to 7(e) are diagrams for illustrating means whereby an item information sheet in a multi-item data input apparatus according to the present invention can be held in a predetermined position with respect to the base sheet and cover sheet of a sheet set in a freely removable manner.
Figure 7B:
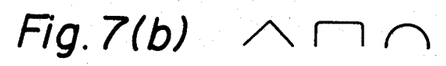
Figure 7C:
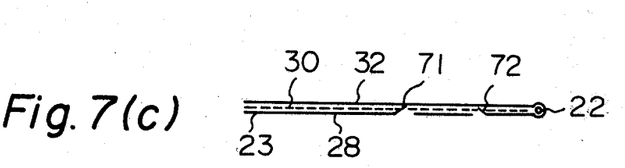

Referring now to FIG. 7(a) to 7(e), various simple and effective arrangements will be described for retaining an item information sheet 30 in a predetermined position with respect to the base sheet 28 and cover sheet 32 of that sheet set. As shown in FIGS. 7(a) and 7(c), a partial cut-out portion 70 of base sheet 28 can be bent upward, to serve as a catch member for engaging with a corresponding aperture provided in item information sheet 30. Two or more of such catch members can be provided, and can also be formed on cover sheet 32 rather than base sheet 28. These partial cut-out portions can be of various shapes, some examples of which are shown in FIG. 7(b). In addition, these partial cut-out portions can be positioned to face toward the rear (i.e. toward attachment rod 22) of sheet set 23, or towards the opposite end of sheet set 23. This is indicated by the examples denoted by numerals 71 and 72 in FIG. 7(c).

Figure 7D:
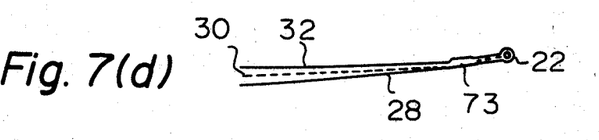

Alternatively, as shown in FIG. 7(d), protruding members 73 can be fixedly mounted on base sheet 28 or cover sheet 32, or can be formed integrally with base sheet 28 or cover sheet 32, and engage with apertures provided in item information sheet 30.

Figure 7E:
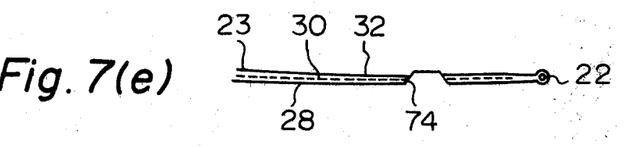

Another arrangement for securing item information sheet 30 is shown in FIG. 7(e), in which base sheet 28 is deeply embossed to form protruding portions 74 which engage apertures in item information sheet 30 and cover sheet 32.

Figure 8A:
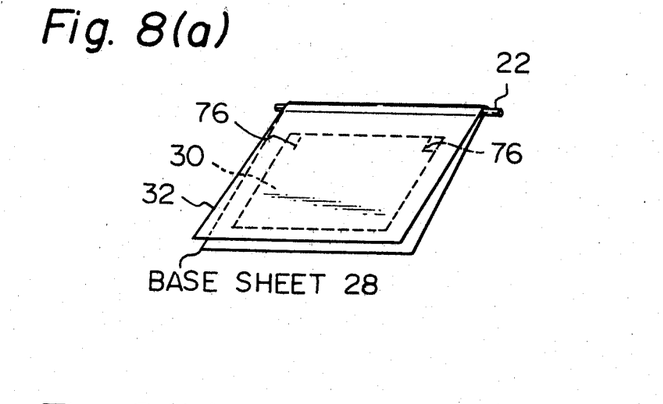
FIG. 8(a), (b) and (c) are diagrams for illustrating another arrangement whereby an item information sheet can be held in a predetermined position between a base sheet and a cover sheet of a sheet set.
Figure 8B:
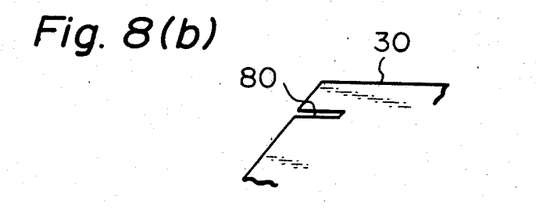
Figure 8C:
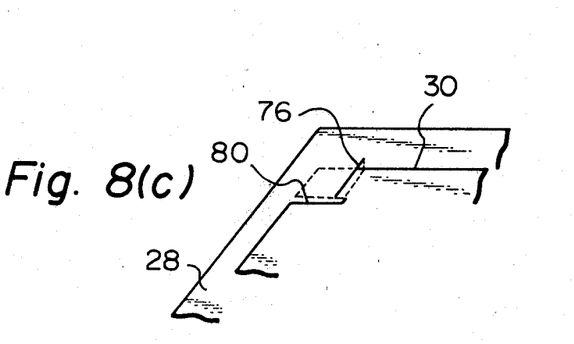

Still another arrangement for securing item information sheet 30 in a predetermined position is shown in FIG. 8(a), 8(b) and 8(c). In this case, longitudinal protruding portions 76 are formed on base sheet 28 as shown in FIG. 8(a) and 8(c), while short transverse slits 80 are cut out of item information sheet 30 as shown in FIG. 8(b). These transverse slits 80 engage with the longitudinal protruding portions of base sheet 28, to hold item information sheet in a predetermined position with respect to base sheet 28 and cover sheet 32.

One problem which can arise with a multi-item data input apparatus of the form described hereinabove is that the flexible sheet sets 23 may adhere to other portions of the apparatus, such as sheet holder unit guide plate 56, upper guide plate 66, or keyboard plate 58, as a sheet set is rapidly unrolled from the sheet holder 16. This adhesion can result from a large area of a sheet set attaining close contact with another part of the apparatus, so that some degree of sticking will occur, or can result from a buildup of a static electric charge on the sheet set or other portion of the apparatus, or from a combination of these factors.

Figure 9A:
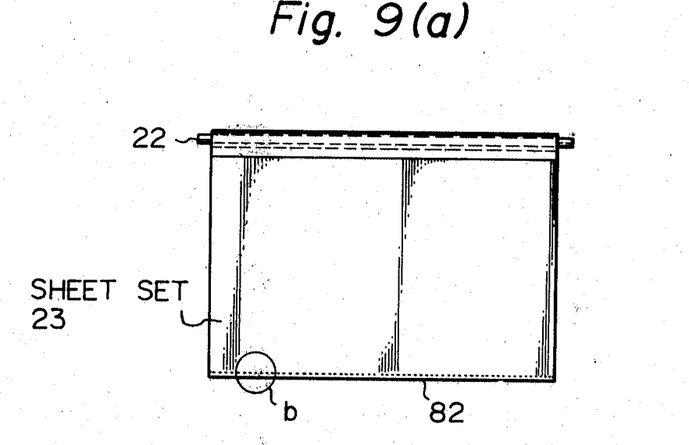
FIG. 9(a), 9(b) and 9(c) illustrate means whereby a buildup of static electric charge upon a sheet set and portions of a multi-item data input apparatus according to the present invention which are contacted by sheet sets during rolling and unrolling operations thereof, can be simply eliminated.
Figure 9B:
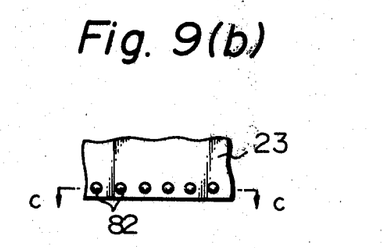
Figure 9C:
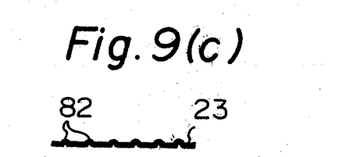

However the inventor has discovered effective means for substantially eliminating such adhesion effects between sheet sets and other parts of the apparatus. For example, as shown in FIGS. 9(a), 9(b) and 9(c), a line of small protrusions 82 can be provided extending outwardly from either the base sheet 28 or the cover sheet 32 (or both of these) of each sheet set 23. FIGS. 9(b) and 9(c) show a portion of sheet set 23, i.e. the portion denoted by the letter b in FIG. 9(a), in plan and cross-sectional elevation views respectively. These protrusions 82 act to prevent a large area of the leading part of sheet set 23 from coming into close contact with other parts of the apparatus, such as sheet holder unit guide plate 56, while a sheet set is being unfolded and directed outward from the sheet holder unit to be placed on upper guide plate 66. As a result, sticking of sheet set 23 to other parts of the apparatus, and a buildup of static electric charge thereon, is substantially eliminated, so that each sheet set is smoothly and reliably fed out onto upper guide plate 66 as required.

Figure 10A:
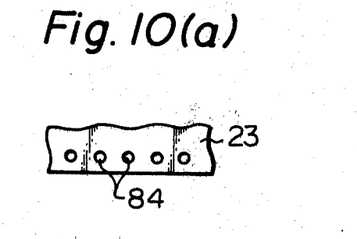
FIG. 10(a) and 10(b) illustrate another method of preventing a buildup of static electric charge on a sheet set of a multi-item data input apparatus according to the present invention
Figure 10B:
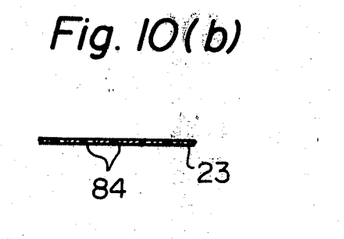

An alternative arrangement for preventing adhesion of a sheet set to other parts of the apparatus during unfolding of a sheet set is shown in FIG. 10(a) and 10(b). In this case, a line of small apertures 84 are provided in either base sheet 28 or cover sheet 32 (or both) of each sheet set. This line of apertures 84 is formed along the leading end of a sheet set 23, as in the example of FIG. 9(a). This method will also substantially eliminate buildup of static electric charge on the sheet set and portions of the apparatus contacted thereby during sheet set unfolding, so that adhesion of the sheet set to other parts of the apparatus is prevented.

This problem can be further alleviated by providing a layer of electrically conducting material on the lower surface of keyboard plate 58, with this layer being connected to ground potential. This layer can be a transparent metallic film, or can have windows provided at positions corresponding to item designation key switches 64.

From the above, it can be understood that a multi-item data input apparatus according to the present invention provides various important advantages. Any desired one of a large number of items can be immediately selected and designated, first by actuating a sheet selection key switch to thereby bring a specific one of a plurality of flexible sheet sets rolled around a sheet holder onto a guide plate which is positioned below an array of transparent item designation key switches. The desired item will then be visible through one of these item designation key switches and can be designated by actuation of that switch. Each sheet set comprises an item information sheet which is retained between a base sheet and a transparent cover sheet. Due to the protection afforded by the cover sheet, the items which are written or printed on each item information sheet will be maintained in a clearly legible condition even after a long period of used, with repeated folding and unfolding of the item information sheet. Furthermore, each item information sheet is held between the base sheet and cover sheet of a sheet set in a freely removable manner so that it is possible to rapidly exchange one item information sheet for another, or amend the items appearing on a sheet. Such ease and convenience of amendment or exchange of item information has not been available with prior art types of multi-item data input apparatus. In addition, as described hereinabove, extremely simple means are available for retaining each item information sheet in a predetermined position with respect to the base sheet and cover sheet of the corresponding sheet set, so that the items appearing on each item information sheet will be accurately positioned below the item designation key switches when that sheet is selected. These simple and effective positioning means retain the ease of removal and replacement of item information sheets which is a basic and important advantage of a multi-item data input apparatus according to the present invention.

From the preceding description, it will be apparent that the objectives set forth for the present invention are effectively attained. Since various changes and modifications to the above construction may be made without departing from the spirit and scope of the present invention, it is intended that fall matter contained in the above description or shown in the accompanying drawings shall be interpreted as illustrative, and not in a limiting sense. The appended claims are intended to cover all of the generic and specific features of the invention described herein.

What is claimed is:

1. A multi-item data input apparatus for manual generation of electrical signals to designate selected ones of a plurality of items, comprising:

a rotatably mounted sheet holder of substantially cylindrical configuration;

a keyboard having a plurality of keys arrayed thereon, each of said keys being transparent in at least a portion thereof;

a plurality of flexible sheet sets, each of said sheet sets comprising a base sheet, an item information sheet, and a cover sheet, said cover sheet being transparent, said item information sheet having a plurality of said items visibly indicated thereon at predetermined positions, and said base sheet and said cover sheet each being fixedly attached at one end thereof to said sheet holder, said item information sheet being held in a freely removable manner between said base sheet and said cover sheet; and guide means operative to retain said flexible sheet sets axially rolled around said sheet holder in a successively overlapping manner when said sheet holder is rotated in a first direction of rotation, and to selectively direct one of said flexible sheet sets to be positioned in a substantially flat condition below said keyboard such that said items appearing on said item information sheet are visible through corresponding ones of said keys.

2. A multi-item data input apparatus according to claim 1, in which each of said flexible sheet sets further comprises positioning means provided on at least one of said base sheet and said cover sheet, for retaining said item information sheet in a predetermined position in relation to said base sheet and cover sheet.

3. A multi-item data input apparatus according to claim 2, in which said positioning means comprise at least one catch member arranged to engage said item information sheet.

4. A multi-item data input apparatus according to claim 3, in which at least one aperture is provided in said item information sheet, for engaging with said catch member.

5. A multi-item data input apparatus according to claim 3, in which said catch member comprises a protruding portion of at least one of said base sheet and said cover sheet.

6. A multi-item data input apparatus according to claim 5, in which said catch member is formed by partially cutting out a portion of at least one of said base sheet and said cover sheet and bending upward said partially cut-out portion.

7. A multi-item data input apparatus according to claim 1, and further comprising means provided on each of said flexible sheet sets for preventing a buildup of static electric charge on said flexible sheet sets.

8. A multi-item data input apparatus according to claim 7, in which said static electric charge prevention means comprise a plurality of protrusions formed on at least one of said base sheet and said cover sheet of a sheet set, said protrusions being formed adjacent to the opposite end of said base sheet or cover sheet to that which is attached to said sheet holder.

9. A multi-item data input apparatus according to claim 8, in which said static electric charge prevention means comprise a plurality of apertures formed in at least one of said base sheet and said cover sheet, said apertures being formed adjacent to the opposite end of said base sheet or cover sheet to that which is attached to said sheet holder.

* * * * *